United States Patent [19]
Thulin et al.

[11] Patent Number: 5,223,292
[45] Date of Patent: Jun. 29, 1993

[54] METHOD AND DOUGH COMPOSITIONS FOR MAKING SHELF-STABLE SOFT OR CHEWY COOKIES

[75] Inventors: Robert R. Thulin, Wyckoff; Robert E. Ross, Wayne; Lori J. Banks, Hackensack, all of N.J.

[73] Assignee: Nabisco, Inc., Parsippany, N.J.

[21] Appl. No.: 224,243

[22] Filed: Jul. 26, 1988

Related U.S. Application Data

[63] Continuation of Ser. No. 870,308, May 23, 1986, abandoned, which is a continuation of Ser. No. 669,847, Nov. 9, 1984, abandoned.

[51] Int. Cl.$^5$ .............................................. A23G 3/00
[52] U.S. Cl. ................................... 426/283; 426/94; 426/275; 426/284; 426/331; 426/496; 426/502; 426/503; 426/549; 426/560
[58] Field of Search ............. 426/94, 103, 275, 283, 426/284, 321, 331, 560, 496, 502, 503, 516, 549

[56] References Cited

U.S. PATENT DOCUMENTS

| | | | |
|---|---|---|---|
| 3,572,259 | 3/1971 | Hayashi | 426/94 |
| 3,656,967 | 4/1972 | Barton et al. | 426/94 |
| 4,250,202 | 2/1981 | Harnett | 426/553 |
| 4,284,652 | 8/1981 | Christensen | 426/321 |
| 4,291,065 | 9/1981 | Zobel et al. | 426/549 |
| 4,344,969 | 8/1982 | Youngquist et al. | 426/18 |
| 4,360,534 | 11/1982 | Brabbs et al. | 426/94 |
| 4,444,799 | 4/1984 | Vanderveer et al. | 426/549 |
| 4,450,179 | 5/1984 | Vink et al. | 426/103 |
| 4,455,333 | 6/1984 | Hong et al. | 426/94 |
| 4,456,625 | 6/1984 | Durst | 426/106 |
| 4,503,080 | 3/1985 | Brabbs et al. | 426/94 |
| 4,511,318 | 4/1985 | Kolodesh et al. | 426/94 |
| 4,511,585 | 4/1985 | Durst | 426/106 |
| 4,514,430 | 4/1985 | Hartman | 426/549 |
| 4,528,900 | 8/1985 | Simelunas | 99/450.7 |
| 4,534,726 | 8/1985 | Simelunas | 425/363 |
| 4,578,027 | 3/1986 | Koppa et al. | 425/298 |
| 4,579,744 | 4/1986 | Thulin | 426/283 |
| 4,582,711 | 4/1986 | Durst | 426/128 |
| 4,624,856 | 11/1986 | Vanderveer et al. | 426/549 |
| 4,668,522 | 5/1987 | Cappel et al. | 426/94 |
| 4,828,853 | 5/1989 | Banks et al. | 426/94 |

FOREIGN PATENT DOCUMENTS

| | | |
|---|---|---|
| 0031718 | 7/1981 | European Pat. Off. . |
| 31802 | 7/1981 | European Pat. Off. . |
| 98642 | 1/1984 | European Pat. Off. . |
| 102232 | 3/1984 | European Pat. Off. . |

(List continued on next page.)

OTHER PUBLICATIONS

Manning, F. "Marble Molasses Cake Squares," Farm Journal's Complete Home Baking Book, (1979).
Pancoast et al, Handbook of Sugars, 2nd ed., AVI Publishing Company, Inc., pp. 232–233 (1989).
Thelen, Ray; *Everything You Need to Know About Cookies*, Ray Thelen publ., North Palm Springs, Fla.; Apr. 1975, pp. 6 and 7.

(List continued on next page.)

*Primary Examiner*—David M. Naff
*Assistant Examiner*—M. Knode

[57] ABSTRACT

Cookies having an extended shelf-stable soft or chewy texture throughout the cookie are prepared by coextruding an inner adherent cookie dough bakeable to a soft or chewy texture and an outer non-adherent cookie dough bakeable to a soft or chewy texture. The inner dough comprises a liquid humectant in an amount sufficient to impart a shelf-stable soft or chewy texture to the baked outer cookie dough in excess of that attainable by baking the outer dough alone to a shelf-stable soft or chewy texture of the same moisture content. The coextrudate is severed into pieces to enrobe the inner cookie dough and the pieces are baked to a moisture content of at least about 6% by weight of the cookie. The outer non-adherent cookie dough, while being bakeable to a soft chewy texture, possesses sufficient cohesiveness and firmness so as to render the coextrudate formable into cookie dough pieces on a mass scale. The use of the non-adherent cookie dough to enrobe the adherent filler dough avoids sticking of the inner adherent cookie dough to oven bands and cookie dough cutting equipment.

14 Claims, No Drawings

FOREIGN PATENT DOCUMENTS

| | | |
|---|---|---|
| 119826 | 9/1984 | European Pat. Off. . |
| 2740245 | 3/1978 | Fed. Rep. of Germany ...... 426/549 |
| 1517158 | 6/1978 | United Kingdom . |

OTHER PUBLICATIONS

Matz, Samuel A., *Cookie and Cracker Technology*; AVI Publ. Co., Westport Conn., 1978; pp. 626–129.

Ludewig, H. G. et al, Eingenung Verschiedener Staerkeverucherungstrodukete zur Herstellung von Muerbkeksen (Suitability of various starch–derived sugar products for preparation of cookies), Getreide, Mehl und Brot, 32, 100 (1978).

Sloan et al, "Investigating Alternative Humectants for Use in Foods" *Food Product Development*, vol. 9, No. 7, p. 75 (1975).

METHOD AND DOUGH COMPOSITIONS FOR MAKING SHELF-STABLE SOFT OR CHEWY COOKIES

This application is a continuation, of application Ser. No. 870,308, filed May 23, 1986, which is a continuation of U.S. Ser. No. 669,847 filed Nov. 9, 1984, both now abandoned.

FIELD OF THE INVENTION

This invention relates to methods for producing cookies having a soft or chewy texture throughout the cookie. This invention also relates to cookie dough compositions for producing the cookies.

BACKGROUND OF THE INVENTION

Cookies with a moisture content above about 6% by weight are usually soft or chewy and cohesive. To produce cookies which retain enough moisture to be classified as soft or chewy, numerous humectants have been used. Exemplary thereof are raisins, raisin pastes, high fructose corn syrup, corn syrup, glycerine, and mixtures thereof. Without the use of such humectants, cookie doughs which contain sufficient water to compensate for volatilization during baking: 1) do not exhibit sufficient cohesiveness for forming into pieces on conventional commerical scale cookie forming equipment, 2) exhibit raw flavor or color qualities, and 3) most importantly, lose their soft or chewy texture within a week or within a few days even when properly packaged in air-tight packaging. Generally, increasing the humectant content of the cookie dough extends the textural stability of soft or chewy cookies. However, as the humectant content of a cookie dough is increased, undesirable texture, appearance and/or flavor characteristics may appear in the final product and dough machineability tends to be reduced to an unacceptable extent.

For example, while raisins and raisin pastes typically contain about 19% by weight water which is held during baking, their flavor and color may be undesirable in certain types of cookies such as butter cookies, vanilla cookies, and the like. Additionally, these humectants tend to contribute localized soft or chewy regions to a cookie rather than a homogeneous soft or chewy texture. Furthermore, these ingredients are relatively expensive for the highly competitive mass-produced cookie market.

Liquid humectants such as high fructose corn syrup, corn syrup, glycerin and molasses are more readily dispersed through a dough for providing a homogeneously soft or chewy texture to the cookies. However, these liquid humectants increase the adherent properties or "stickiness" of cookie doughs. Sticking or adherence of this dough to rotary cutters, reciprocating cutters, cutter aprons, oven belts, and wire cutters place an upper limit on their use in producing extended shelf-stable soft or chewy cookies on a commercial scale. In addition to increasing stickiness, the liquid humectants can result in difficulty in extruding the dough and forming the doughs into pieces. Cookie dough softness and adherency considerations have generally limited the liquid humectant content and water content of cookie doughs such that cookies mass produced from such doughs exhibit shelf-stable soft or chewy textures for periods of only up to about three weeks with proper air-tight packaging.

The present invention provides a method for mass producing cookies having an extended shelf-stable soft or chewy texture throughout for periods of from about six months to one year with proper packaging. The exceptionally long textural stability of the cookies are obtained from a coextruded dough composition which contains a liquid humectant in an amount sufficient to impart the extended shelf-stable soft texture to the cookie. In spite of the high level of liquid humectant, the coextruded dough composition possesses sufficient firmness and cohesiveness to be formed into pieces without sticking or adhering upon dough forming and transferring equipment. The cookies produced from the coextruded dough composition have the appearance of a single dough cookie.

SUMMARY OF THE INVENTION

The present invention provides a cookie having an extended shelf-stable soft or chewy texture throughout the cookie which is mass produced from an adherent cookie dough. The adherent cookie dough is coextruded with an outer non-adherent cookie dough. Each of the cookie doughs are bakeable to a soft or chewy texture and comprise a liquid humectant. The amount of liquid humectant in the inner dough is sufficient to impart a shelf-stable soft or chewy texture to the baked outer cookie dough in excess of that attainable by baking the outer dough alone to a shelf-stable soft or chewy texture of the same moisture content. The outer non-adherent cookie dough possesses sufficient firmness and cohesiveness to enable forming of the extrudate rope into pieces without contact between the inner sticky dough and dough forming and transferring equipment. The coextrudate is severed into pieces to enrobe the adherent cookie dough within the non-adherent soft or chewy cookie dough. The pieces are baked to a moisture content of at least about 6% by weight of the cookie. The cookies of the present invention are texturally stable and microbially stable for prolonged periods (preferably more than about six months) of storage at room temperature when properly packaged.

DETAILED DESCRIPTION OF THE INVENTION

It is well known that when humectants are added to a cookie dough, the product baked from the dough will possess a plastic, moist and non-hardening crumb structure, which will be retained during storage in conventional packaging for greater than two weeks, and even up to periods of many months. In mass producing cookies having a soft or chewy crumb structure, however, the amount of liquid humectant which can be added to the cookie dough is limited by the adverse effects of reduced formability and increased adhesiveness of the dough.

In the present invention, an adherent cookie dough which is bakeable to a soft or chewy crumb structure is coextruded with a non-adherent cookie dough. The non-adherent cookie dough is also bakeable to a shelf-stable soft or chewy crumb structure. Inclusion of a liquid humectant in the inner sticky dough has been found to dramatically extend the period of time which the outer non-adherent dough remains soft or chewy. Baking of the non-adherent dough alone to a moisture content of 6%, for example, may result in a soft or chewy shelf life of about three weeks under proper packaging and storage conditions. At this point, the cookie has generally lost sufficient moisture so as to develop a dry or stale mouthfeel throughout a substantial outer portion of the cookie. However, when the same non-adherent dough enrobes the adherent dough and the dough piece is baked to a soft and chewy texture having the same moisture content, i.e. six percent, the portion of the cookie baked from the non-adherent dough retains a soft or chewy texture for unexpectedly prolonged periods of time, i.e. for periods of from six months to twelve months when packaged under the same conditions.

It is believed that the higher levels of liquid humectant and water which are incorporated into the inner portion of the cookie: 1) inhibits moisture migration, and 2) diminishes the percentage of moisture lost, respectively, from the entire cookie into the head space of the package. It is further believed that some of the humectant initially in the inner adherent dough, migrates to the portion of the cookie baked from the non-adherent cookie dough thereby providing a cookie which retains a soft or chewy texture throughout for prolonged periods.

Additionally, doughs with very high amounts of humectant sugars when baked alone, develop an undesirably overbaked appearance before completion of the baking process. Enrobing of such doughs in a non-adherent dough having a lower amount of reducing sugars eliminates the undesirable discolorization by insulation of the inner dough from high oven temperatures.

A wide variety of food-compatible liquid humectants may be employed for imparting shelf-stable softness or chewiness to the chewy portion of the cookies of the present invention. Liquid humectants which can be employed include sugar and/or non-sugar ingredients which bind moisture in a baked dough. The binding should be such that the equilibrium rate of moisture loss from the baked product to the environment due to the presence of the humectant is slowed to such a degree that a baked product containing the humectant, and having an initial moisture content of at least about 6%, retains a soft and pliable texture throughout for at least about 2 months, and preferably for at least about 6–12 months when the cookie is stored in a closed container.

Suitable liquid humectant sugars include corn syrups, invert syrups, high fructose corn syrups, honey, molasses, as well as mixtures thereof. Aqueous solutions of fructose and/or dextrose or other humectant sugars may be used but are not desirable because of the high cost and hygroscopicity of their crystalline forms. Examples of other humectant sugars include maltose, sorbose, manose, galactose, and the like.

Commercially available high fructose corn syrups are the preferred liquid humectants. They are low in cost, are highly humectant, provide a pleasant sweet taste, and are readily commercially available. They are prepared by the enzymatic isomerization of dextrose containing corn syrups, and typically possess a sugar solids component of about 40% to about 100% by weight fructose, with the balance of the non-fructose sugar solids being primarily dextrose plus minor amounts of other monosaccharides. The sugar solids content of commercially available high fructose corn syrups typically ranges from about 70% to 73%, up to about 82% by weight. Commercially available high fructose corn syrups having about 40% to about 45% by weight of their solids as fructose are preferred from the standpoint of cost. However, commercially available high fructose corn syrups having at least 80% by weight of their solids as fructose are readily available, for example, and may also be used.

In addition to the humectant sugars, a wide variety of liquid humectants or aqueous solutions of humectants which are not sugars or possess a low degree of sweetness relative to sucrose may also be employed in the chewy doughs of this invention. For example, the use of glycerol, sugar alcohols such as mannitol, maltitol, xylitol, and sorbitol, and other polyols as humectants is well known in the art. Additional examples of humectant polyols (e.g. polyhydric alcohols) include humectant glycols, hydrogenated glucose syrups, sugar esters, dextrins, and other starch hydrolyzation products. However, the liquid humectant sugars are preferred because of their sweetness.

The liquid humectant used in the non-adherent cookie dough and in the adherent cookie dough may be the same or different. The amount of liquid humectant used in the non-adherent cookie dough should not render the dough adherent. The amount should preferably be sufficient to impart a shelf stable soft or chewy texture of at least one week to cookies baked from the non-adherent dough alone. Suitable amounts of liquid humectant are from about 10% by weight to about 50% by weight based upon the weight of the flour in the non-adherent cookie dough, depending upon its water content and the amount of humectant solids, such as fructose. At amounts greater than about 50% by weight of liquid humectant, the machineability of the doughs tends to decrease excessively. At amounts of liquid humectant less than about 10% by weight, the retention of a soft or chewy texture decreases without any significant improvement in dough machineability. The non-adherent doughs of the present invention, upon squeezing in one's hand, should compact without squeezing between one's fingers and should be readily releasable from one's hand. Generally, liquid humectants having a high humectant sugar content, e.g. above about 65% by weight of the liquid humectant are preferred for increased humectancy and avoidance of stickiness. A typical amount of liquid humectant in the non-adherent cookie dough ranges up to about 15% by weight based upon the weight of the flour in the non-adherent cookie dough for a high fructose corn syrup having a solids content of about 77% by weight and a fructose content of about 90% by weight of the solids. For a high fructose corn syrup having a solids content of about 72% by weight and a fructose content and dextrose content of about 43% and 50% by weight of the solids, respectively, a typical amount ranges from about 20% to about 50% by weight of liquid humectant, based upon the weight of the flour.

The amount of liquid humectant used in the inner adherent cookie dough should be sufficient to impart a shelf-stable soft or chewy texture to the baked outer cookie dough in excess of that attainable by baking the outer dough alone to a shelf-stable soft or chewy texture of the same moisture content. The adherent cookie doughs suitably contain from about 30% by weight to about 120% by weight of liquid humectant, based upon the weight of the flour in the adherent cookie dough, depending upon its water content and the amount of humectant solids, such as fructose. At amounts of liquid humectant greater than about 120% by weight, the cookie tends to exhibit a dense, gummy mouthfeel rather than a desirable soft or chewy and tender mouthfeel. The soft or chewy texture should be such so as to provide a non-cohesive, readily soluble mouthfeel. The adherent doughs, when squeezed in the hand, do not compact, but rather flow between one's fingers and tend to stick to one's hands. A suitable amount of liquid humectant in the adherent dough ranges, on a flour basis: 1) from about 30% to about 45% by weight of a high fructose corn syrup having about 77% by weight solids and a fructose content of about 90% by weight of the solids, and 2) from about 65% to about 90% by weight of a high fructose corn syrup having about 71% by weight solids with the solids being about 43% by weight fructose and about 50% by weight dextrose.

To promote a tender, non-cohesive soft or chewy crumb structure, particularly when high levels of humectant are used, it is desirable to include one or more emulsifiers and/or pregelatinized starch in the inner, adherent cookie dough. Suitable amounts are up to about 3% by weight of one or more emulsifiers and up to about 12% by weight of one or more pregelatinized starches, each percent being based upon the weight of the flour. Exemplary or pregelatinized starches are pregelatinized corn, wheat, and waxy maize starch. Typical emulsifiers which can be used include sorbitan monostearate, mono- and/or di-glycerides, polyoyethylene sorbitan fatty acid esters, such as polysorbate (polyoxyethylene (20) sorbitan monostearate), and sodium stearoyl-2-lactate. The emulsifiers and/or pregelanitized starches may also be included in the outer non-adherent cookie dough.

The initial moisture content of the outer non-adherent soft or chewy dough is adjusted to provide the desired consistency to the dough to enable proper working and shaping of the dough and of the coextrudate. The total moisture content of the inner and outer doughs will include any water included as a separately added ingredient, as well as the moisture provided by flour (which usually contains 12% to 14% by weight moisture), and the moisture content of other dough additives included in the formulation, such as high fructose corn syrup, invert syrups, or other liquid humectants. Taking into account all sources of moisture in the dough, including separately added water, the total initial moisture content of the non-adherent dough should be less than about 15% by weight of the dough formulation, exclusive of particulate inclusions such as nuts, raisins, chocolate chips, and the like. At moisture contents above about 15% by weight, the dough compositions tend to stick excessively to processing equipment such as conveyors, dough cutters, and the like.

The initial moisture content of the inner adherent soft or chewy cookie dough may be at least about 25% by weight more than the moisture content of the non-adherent cookie dough without adversely affecting machineability of the coextruded cookie dough formulation. However, the initial moisture content of the inner adherent cookie dough should be less than about 20% by weight of the dough formulation exclusive of particulate inclusions, so as to avoid excessive oven spread.

A non-humectant sugar such as sucrose, may be employed in the adherent cookie dough and/or the non-adherent cookie dough to enhance sweetness of the final product and to control oven spread. However, the amount employed should be such that it does not crystallize to a such a degree that it undesirably detracts from the extended retention of a soft or chewy texture in the baked product. Typical amounts of sucrose range up to about 45% by weight, suitably up to about 35% by weight, of the flour for each dough.

The flour and shortening employed in the adherent soft or chewy dough and in the non-adherent, soft or chewy enrobing dough of this invention are selected from conventional ingredient lines. The flour component may be any comminuted cereal grain or edible seed meal such as wheat flour, corn flour, corn starch, modified starch, rice flour, potato flour, barley flour, or the like. Wheat flour is preferred. The shortening may be any edible fat or oil or mixtures thereof suitable for baking applications, and may further include conventional food-grade emulsifiers. The shortening may be present in each dough in amounts ranging from about 20% to about 80% by weight, based upon the weight of the flour.

Each of the doughs may contain from about 0% to about 5% by weight of a leavening system, based upon the weight of the flour of each dough. The leavening system employed in each dough may be the same or different.

In addition to the foregoing, the soft or chewy adherent dough and the non-adherent enrobing dough may include other additives conventionally employed in cookie products. Exemplary thereof are milk products or milk by-products, egg products or egg by-products, cocoa, vanilla, cereal (oatmeal), as well as inclusions such as nuts, raisins, coconut, flavor chips, such as chocolate chips, butterscotch chips, caramel chips, and the like.

The chewy cookie adherent dough and the non-adherent chewy cookie dough can each be prepared in conventional manner using a creaming stage and a dough forming stage. Flavor chips are added to each dough with minimal mixing so as to avoid smearing thereof into the dough. The adherent cookie dough is preferably cooled to about 60° F. to about 65° F. using $CO_2$ snow to facilitate its transfer to the coextruder.

The two doughs may be combined by coextrusion through concentric dies to obtain a coextrudate rope with the soft or chewy adherent dough inside and the soft or chewy non-adherent cookie dough outside. The coextrudate rope is cut into pieces using a reciprocating cutter which severs the rope and stretches the outer dough to close the end portions of the rope so as to obtain an enrobed dough piece which is bakeable to the cookie of the present invention. Apparatus for forming the enrobed dough piece is described in detail, and incorporated herein by reference, in pending U.S. application Ser. No. 540,982, "High Production Method And Apparatus For Forming Filled Edible Products", filed in the name of William Simelunas on Oct. 11, 1983 now U.S. Pat. No. 4,528,900.

The dough pieces bakeable to a soft or chewy texture throughout, suitably have a weight ratio of the soft or chewy adherent dough (or filling) to the non-adherent dough (or casing) within the rage of from about 0.80 to about 1.2, approximately equal amounts of each dough being preferred.

The time and temperature of baking are adjusted in accordance with conventional techniques to provide a moisture content in the baked product of 6% or above. The preferred moisture content ranges from about 7% to about 8%, based upon the weight of the baked product. The water activity of the baked product should be less than about 0.7, preferably less than or equal to about 0.6 to assure microbial shelf stability. While baking time and temperatures will vary for different dough formulations, oven type, etc., in general, commercial cookie baking times may range from about 5 minutes to 15 minutes, and baking temperatures for cookie products may range from about 250° F. to about 500° F.

As employed in the context of the present invention, the term "chewy" is intended to define textures which possess a discernible degree of plasticity. Chewiness also connotes impressions of softness and moistness. Crispness and chewiness can be described in terms of taste panel tests which take as standards the texture of fresh saltine crackers having a moisture content of about 2% (rating of 0) and a freshly baked cookie having a distinctly chewy texture throughout (rating of 10): i.e., chewy cookies prepared in accordance with the following recipe:

|  |  |
|---|---|
| ⅔ | sugar |
| ¼ | butter or regular margarine |
| 1 tsp. | ground ginger |
| ½ tsp. | ground cinnamon |
| ¼ tsp. | baking soda |
| ½ tsp. | salt |
| ½ tsp. | vanilla |
| 1 | egg |
| ½ c. | honey |
| 1¼ c. | sifted flour |

The cookies are prepared by combining ⅔ cup of sugar, butter, ginger, cinnamon, baking soda, salt and vanilla in a large mixing bowl and creaming the ingredients until they are light and fluffy. Next the eggs are added and beat in until the mixture is very fluffy. The honey is then blended in, followed by the blending in of the flour a little at a time. The dough is dropped by teaspoonfuls 2½ inches apart onto a lightly greased baking sheet, baked at 350° F. for 10 to 15 minutes until lightly browned and removed at once from the baking sheet to racks to cool thoroughly.

Employing the rating scale described above, the product of this invention preferably has a rating of at least 3 and most preferably at least 5 throughout its extended shelf life of from about 6 months to about 1 year. The regions baked from the adherent dough and from the non-adherent cookie dough should show a difference in ratings of less than two units, and most preferably less than one unit throughout the extended shelf life of the cookie. Slight differences in texture may occur due to normal crust formation caused by higher temperatures at the cookie surface during baking. However, such differences are considered as acceptable.

The cookie dough compositions of the present invention may be used for the production of drop-type cookies, such as chocolate chip cookies, oatmeal cookies, peanut butter cookies, sugar cookies, and the like.

The present invention is further illustrated in the following examples where all parts, ratios, and percentages are by weight, and all temperatures are in °F, unless otherwise stated:

EXAMPLE 1

A soft or chewy textured chocolate chip cookie is prepared by coextruding an inner adherent cookie dough bakeable to a soft or chewy texture with an outer non-adherent cookie dough bakeable to a soft or chewy texture through a concentric die into a coextrudate rope. The rope is severed with a reciprocating cutter having hemispherically shaped dough forming sections into enrobed dough pieces. The weight of the inner ball of dough is about equal to the weight of the outer non-adherent dough. The ingredients and their relative amounts used to prepare the non-adherent casing dough bakeable to a soft or chewy texture are:

| Casing Ingredients | Amount (Pounds) |
|---|---|
| flour (about 12% $H_2O$ by weight) | 100 |
| high fructose corn syrup (about 72% solids, 42% fructose, 50% dextrose | 30 |
| granulated sugar | 26 |
| molasses (about 25% by weight $H_2O$) | 3 |
| hydrogenated vegetable shortening | 55 |
| sodium bicarbonate | 1.25 |
| calcium phosphate, monobasic | 0.25 |
| water | 8 |
| chocolate drops (4800 count) | 50 |
| minor flavoring and texturizing ingredients (dried eggs, salt vanilla, caramel) | 3 |

The casing dough bakeable to a soft or chewy texture is prepared by first mixing half of the granulated sugar with the shortening and minor texturing and flavoring ingredients until a smooth consistency is obtained. Next, the molasses, water, and high fructose corn syrup are added to the foregoing and mixed. The flour is blended with the leavener and the remaining granulated sugar to form a dough. As a final step, the chocolate drops are blended into the dough at slow speed.

The ingredients and their relative amounts used to prepare the adherent dough (filling) bakeable to a soft or chewy texture are:

| Filling Ingredients | Amount (pounds-ounces) |
|---|---|
| flour (about 12% $H_2O$ by weight) | 100 - 0 |
| chocolate drops (4200 count) | 75 - 0 |
| sucrose | 25 - 0 |
| vegetable shortening | 38 - 0 |
| high fructose corn syrup (about 72% solids, 42% fructose, 50% dextrose) | 85 - 0 |
| milk powder | 4 - 0 |
| ammonium bicarbonate | 0 - 4 |
| sodium bicarbonate | 1 - 4 |
| calcium phosphate, monobasic | 0 - 5 |
| modified corn starch | 8 - 8 |
| dried eggs | 1 - 8 |
| flavorants and other minor ingredients | 1 - 13 |
| water | 13 - 0 |

The chewy filler cookie dough is prepared by first mixing at a slow speed the sucrose and the shortening, to achieve a homogeneous mixture. The modified starch, milk powder, eggs and flavorants are mixed in and the ammonium bicarbonate and water are added while mixing at a slow mixing speed. The high fructose corn syrup is added with mixing and with the application of $CO_2$ to cool it so as to yield a final dough temperature of 60° to 62° F. This is followed by the addition with mixing of the flour, sodium bicarbonate and calcium phosphate, monobasic for about three minutes. As a final step, the chocolate chips are blended into the dough at 60° F. and at a slow speed.

The enrobed cookie preform is then prepared, and the composite dough is baked to an end point moisture content of about about 7%, and cooled at room temperature. The cookie is stored in a closed container at room temperature until the moisture in the cookie has equilibrated between the outer and inner chewy regions of the cookie. The outer dough portion and the inner dough portion possess a soft and plastic crumb matrix having a distinctly leavened appearance.

EXAMPLE 2

Soft or chewy textured cookies are made as in Example 1 except 75 lbs. of the high fructose corn syrup are used instead of 85 lbs. in the adherent filler dough.

EXAMPLE 3

Soft or chewy textured cookies are made as in Example 1 except the ingredients and their relative amounts for the casing dough and the filler dough are:

| Casing Ingredients | Amount (Pounds) |
|---|---|
| flour (about 12% by weight H$_2$O) | 100 |
| high fructose corn syrup (about 72% solids, 42% fructose, 50% dextrose) | 30 |
| granulated sugar | 26 |
| molasses (about 25% by weight H$_2$O) | 2 |
| honey (about 17% by weight H$_2$O) | 3 |
| hydrogenated vegetable shortening | 55 |
| sodium bicarbonate | 1.25 |
| calcium phosphate, monobasic | 0.25 |
| water | 8 |
| chocolate drops | 36 |
| minor flavoring and texturizing ingredients (dried eggs, salt, vanilla, and caramel) | 4.5 |
| Filling Ingredients | Amount (pounds-ounces) |
| flour (about 12% H$_2$O by weight) | 100 - 0 |
| chocolate drops (4200 count) | 58 - 5 |
| sucrose | 25 - 0 |
| vegetable shortening | 38 - 0 |
| high fructose corn syrup (about 72% solids, 42% fructose, 50% dextrose) | 70 - 0 |
| honey (about 17% by weight H$_2$O) | 3 - 8 |
| milk powder | 4 - 0 |
| ammonium bicarbonate | 0 - 6 |
| sodium bicarbonate | 1 - 4 |
| calcium phosphate, monobasic | 0 - 5 |
| modified corn starch | 8 - 8 |
| dried eggs | 1 - 8 |
| flavorants and other minor ingredients | 1 - 11 |
| water | 11 - 0 |

EXAMPLE 4

Soft or chewy textured cookies are made as in Example 1 except in the casing dough: 1) 15 lbs. of high fructose corn syrup (about 77% solids, 90% fructose) are substituted for the 30 lbs. of high fructose corn syrup, and 2) the amount of water is increased to 10 lbs.

What is claimed is:

1. A method for producing a cookie having an extended shelf stable soft or chewy texture throughout the cookie comprising:

(a) coextruding an inner cookie dough which is adherent to dough forming and transferring equipment and which is bakeable to a soft or chewy texture and an outer cookie dough which is non-adherent to dough forming and transferring equipment and which is bakeable to a soft or chewy texture, said inner dough comprising a liquid humectant in an amount which is from about 30% by weight to about 120% by weight, based upon the weight of the flour and which is sufficient to impart a longer lasting shelf-stable soft or chewy texture to the baked outer cookie dough than that attainable by baking the outer dough alone to a shelf stable soft or chewy texture of the same moisture content as that of said cookie having both said inner and outer doughs, said outer dough comprising flour, less than or equal to 45% by weight sucrose, based upon the weight of the flour, and a liquid humectant in an amount of from about 10% by weight to about 50% by weight of the flour, said liquid humectant being selected from the group consisting of corn syrups, invert syrups, high fructose corn syrups, honey, molasses, and mixtures thereof, (b) forming the coextrudate into pieces with dough forming equipment so as to enrobe the inner cookie dough without contact between the inner adherent dough and the dough forming equipment, and (c) baking the pieces to a moisture content of at least about 6 percent by weight of the cookie wherein said cookies retain a shelf-stable soft or chewy texture throughout the cookie for at least about two months in a closed container.

2. A method as claimed in claim 1 wherein the liquid humectant of each dough is the same.

3. A method as claimed in claim 2 wherein the liquid humectant comprises a high fructose corn syrup.

4. A method as claimed in claim 3 wherein the solids content of said high fructose corn syrup is from about 70% by weight to about 82% by weight.

5. A method as claimed in claim 4 wherein at least about 80% by weight of said solids content of said high fructose corn syrup is fructose.

6. A method as claimed in claim 1 wherein the liquid humectant of each dough is a mixture of liquid humectants.

7. A method as claimed in claim 1 wherein said adherent dough further comprises up to about 12 percent by weight of a pregelatinized starch based upon the weight of the flour.

8. A method as claimed in claim 7 wherein said adherent dough further comprises up to about 3 percent by weight of an emulsifier based upon the weight of the flour.

9. A method as claimed in claim 1 wherein the weight ratio of said adherent dough to said non-adherent dough ranges from about 0.80 to about 1.2.

10. A method as claimed in claim 9 wherein the moisture content of said adherent soft cookie dough is at least about 25 percent by weight more than the moisture content of said non-adherent soft cookie dough.

11. A method as claimed in claim 10 wherein the moisture content of said non-adherent dough is less than about 15 percent by weight, based upon the weight of the non-adherent dough.

12. A method as claimed in claim 11 wherein said cookie is a chocolate chip cookie.

13. A method as claimed in claim 1 wherein each of said doughs contains less than or equal to 45% by weight sucrose, based upon the weight of the flour for each dough.

14. A method as claimed in claim 1 wherein each of said doughs contains less than or equal to 35% by weight sucrose, based upon the weight of the flour for each dough.

* * * * *